(12) United States Patent
Snow et al.

(10) Patent No.: US 10,648,365 B2
(45) Date of Patent: May 12, 2020

(54) GAS TURBINE ENGINE BEARING SUMP AND LUBRICANT DRAIN LINE FROM COOLING PASSAGE

(71) Applicant: General Electric Company, Schenectady, NY (US)

(72) Inventors: Kyle Robert Snow, Loveland, OH (US); Brandon Wayne Miller, Liberty Township, OH (US); Duane Howard Anstead, Fairfield, OH (US); Jonothan Allen Scheetz, Waynesville, OH (US); Mohammed El Hacin Sennoun, West Chester, OH (US); Ning Fang, Mason, OH (US)

(73) Assignee: General Electric Company, Schenectady, NY (US)

( * ) Notice: Subject to any disclaimer, the term of this patent is extended or adjusted under 35 U.S.C. 154(b) by 1214 days.

(21) Appl. No.: 14/962,217

(22) Filed: Dec. 8, 2015

(65) Prior Publication Data

US 2017/0159493 A1 Jun. 8, 2017

(51) Int. Cl.
*F01D 25/18* (2006.01)
*F01D 25/16* (2006.01)
(Continued)

(52) U.S. Cl.
CPC ........... *F01D 25/18* (2013.01); *F01D 25/125* (2013.01); *F01D 25/16* (2013.01); *F01D 25/183* (2013.01);
(Continued)

(58) Field of Classification Search
CPC ...... F01D 25/125; F01D 25/16; F01D 25/183; F01D 25/18; F01D 25/20; F02C 7/28;
(Continued)

(56) References Cited

U.S. PATENT DOCUMENTS 4,824,327 A * 4/1989 Titterton, III ........... F01D 25/18
416/146 A
5,498,352 A * 3/1996 Graham ............... C10M 111/04
508/419

(Continued)

FOREIGN PATENT DOCUMENTS

EP 1 749 977 A1 2/2007
EP 2 573 329 A2 3/2013
(Continued)

OTHER PUBLICATIONS

Notification of Reasons for Refusal issued in connection with corresponding JP Application No. 2016-233756 dated Jan. 9, 2018.
(Continued)

*Primary Examiner* — William H Rodriguez
*Assistant Examiner* — Kyle Robert Thomas
(74) *Attorney, Agent, or Firm* — Dority & Manning, P.A.

(57) ABSTRACT

A gas turbine engine having a core engine. The core engine includes an inlet, a compressor section, a combustion section, a turbine section, and an exhaust. The gas turbine engine also includes a bearing sump arranged in the core engine for containing lubrication, the bearing sump and lubrication having an operational range between at least about 0° F. and about 550° F.

16 Claims, 4 Drawing Sheets

(51) Int. Cl.
*F01D 25/12* (2006.01)
*F01D 25/20* (2006.01)
*F02C 7/28* (2006.01)
*F02C 3/04* (2006.01)
*F02C 7/06* (2006.01)

(52) U.S. Cl.
CPC ............... *F01D 25/20* (2013.01); *F02C 3/04* (2013.01); *F02C 7/06* (2013.01); *F02C 7/28* (2013.01); *F05D 2240/50* (2013.01); *F05D 2260/6022* (2013.01); *F05D 2260/98* (2013.01)

(58) Field of Classification Search
CPC ................... F02C 7/06; F05D 2240/50; F05D 2260/6022; F05D 2260/98
See application file for complete search history.

(56) References Cited

U.S. PATENT DOCUMENTS

| | | | |
|---|---|---|---|
| 7,569,740 | B2 | 8/2009 | Elomari |
| 7,754,664 | B2 | 7/2010 | Qu et al. |
| 8,227,392 | B2 | 7/2012 | Wu et al. |
| 8,568,608 | B2 | 10/2013 | Schiflett et al. |
| 8,991,179 | B2 | 3/2015 | Berger et al. |
| 2007/0028590 | A1* | 2/2007 | Bart .................... F01D 25/16 60/39.08 |
| 2009/0199534 | A1 | 8/2009 | Bart et al. |
| 2010/0093577 | A1 | 4/2010 | Ritchie et al. |
| 2013/0078080 | A1* | 3/2013 | Durocher .............. F01D 25/125 415/110 |
| 2013/0137615 | A1 | 5/2013 | Hayama et al. |
| 2013/0259653 | A1* | 10/2013 | Schwarz ................. F01D 15/12 415/122.1 |
| 2014/0171348 | A1* | 6/2014 | Patil ..................... C10M 171/00 508/284 |
| 2015/0125264 | A1 | 5/2015 | Lighty et al. |
| 2017/0159564 | A1 | 6/2017 | Miller et al. |
| 2017/0321142 | A1* | 11/2017 | Goujon ................ C10M 105/70 |

FOREIGN PATENT DOCUMENTS

| | | |
|---|---|---|
| JP | 2012-031275 A | 2/2012 |
| WO | WO 2013/158473 A1 | 10/2013 |

OTHER PUBLICATIONS

Extended European Search Report and Opinion issued in connection with corresponding EP Application No. 16201969.9 dated Apr. 20, 2017.

\* cited by examiner

GAS TURBINE ENGINE BEARING SUMP AND LUBRICANT DRAIN LINE FROM COOLING PASSAGE

FIELD OF THE INVENTION

The present subject flatter relates generally to a bearing sump for a gas turbine engine.

BACKGROUND OF THE INVENTION

A gas turbine engine generally includes a fan and a core arranged in flow communication with one another. The core of the gas turbine engine generally includes, in serial flow order, a compressor section, a combustion section, a turbine section, and an exhaust section. In operation, at least a portion of air over the fan is provided to an inlet of the core. Such portion of the air is progressively compressed by the compressor section until it reaches the combustion section. Fuel is mixed with the compressed air and burned within the combustion section to provide combustion gases. The combustion gases are routed from the combustion section through the turbine section to drive one or more turbines within the turbine section. The one or more turbines within the turbine section maybe coupled to one or more compressors of the compressor section via respective shaft(s). The combustion gases are then routed through the exhaust section, e.g., to atmosphere.

Gas turbine engines accordingly include a variety of rotating components, which are typically provided with some form of lubrication oil. For example, the gas turbine engines include one or more bearings for supporting rotation of the shaft(s) connecting the turbine section to the compressor section. A bearing sump is provided around the one or more bearings to collect the lubrication oil provided to such one or more bearings.

However, the inventors of the present disclosure have discovered that there is a disparity between a maximum operating range of the one or more bearings (derived as a function of a material hardness of the one or more bearings) and an operating range of the lubrication oil. Accordingly, a gas turbine engine capable of more fully utilizing the maximum operating range of the one or more bearings would be useful. More particularly, a gas turbine engine having an increased efficiency by more fully utilizing the maximum operating range of the one or more bearings would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a core engine having an inlet, a compressor section, a combustion section, a turbine section, and an exhaust. The gas turbine engine also includes a bearing sump arranged in the core engine for containing a lubrication, the bearing sump and lubrication having an operational range between at least about 0 degrees Fahrenheit and about 550 degrees Fahrenheit.

In another exemplary embodiment of the present disclosure, a gas turbine engine is provided. The gas turbine engine includes a core engine having an inlet, a compressor section, a combustion section, a turbine section, and an exhaust. The turbine section includes a turbine and the core engine defines a rotor bore cavity inward of the turbine. The gas turbine engine also includes a bearing sump arranged in the core engine and defining a sump cavity. The gas turbine engine also includes at most one drain compartment positioned between the sump cavity of the bearing sump and the rotor bore cavity of the core engine.

In still another exemplary embodiment of the present disclosure, a gas turbine engine having a core engine and a fan is provided. The core engine includes an inlet, a compressor section, a combustion section, a turbine section, and an exhaust. The gas turbine engine includes a bearing sump arranged in the core engine for containing a lubrication, the bearing sump and lubrication having an operational range between at least about 0 degrees Fahrenheit and about 550 degrees Fahrenheit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Figure 1:
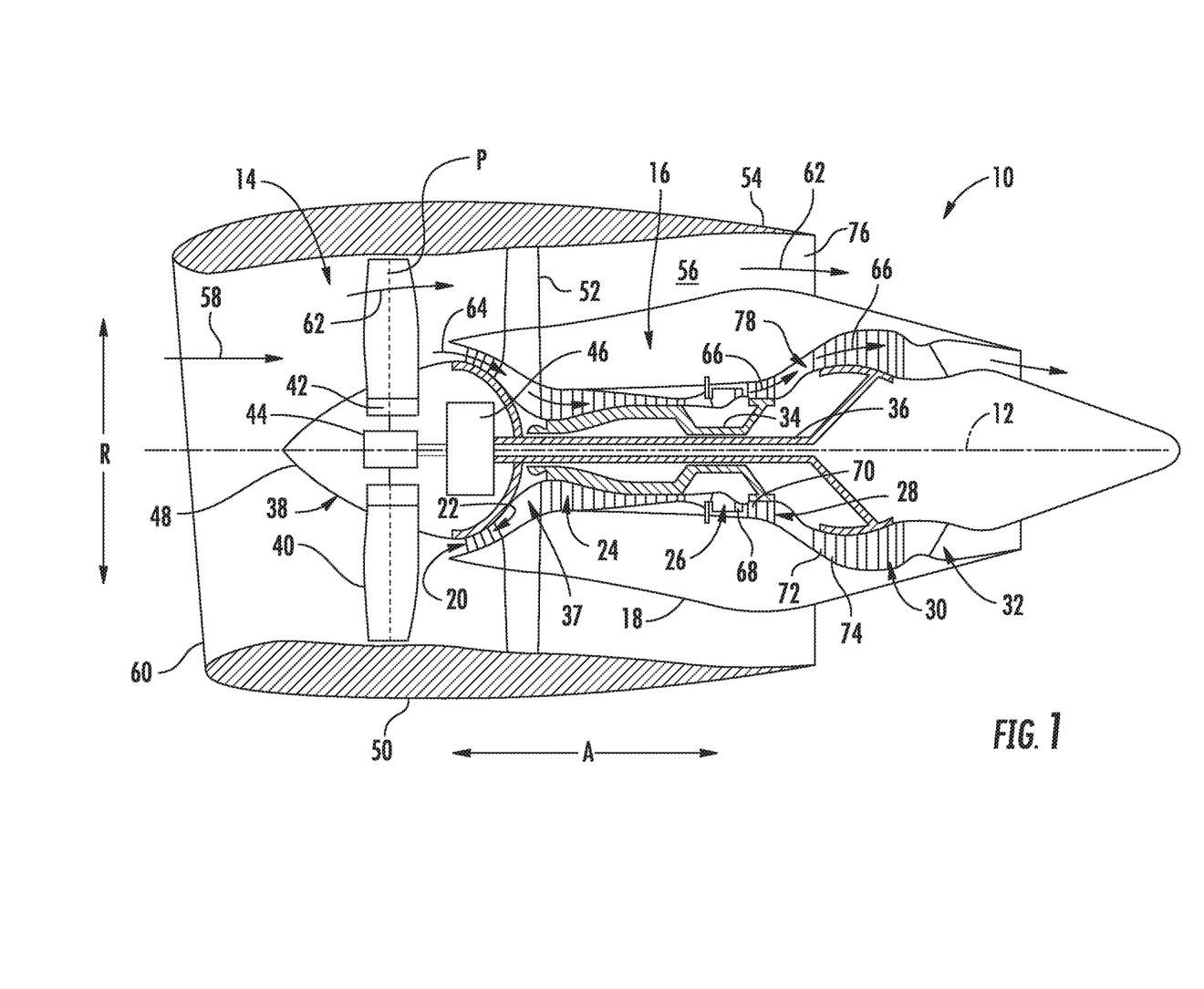
FIG. 1 is a schematic, cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. Additionally, the exemplary core turbine engine 16 includes, and the outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

The exemplary turbofan engine 10 depicted in FIG. 1 is configured as an under-wing, mounted, commercial aircraft engine. Commercial aircraft engines are integrated into aircraft operated for hire to transport passengers and/or cargo. Commercial aircraft engines are required by, e.g., government regulations and economic drivers, to emphasize reliability, fuel efficiency, low emissions, etc., over, e.g., power production and responsiveness, which are valued in military aircraft engines. Additionally, the exemplary turbofan engine 10 depicted in FIG. 1 is configured to generate a relatively large amount of thrust. For example, the exemplary turbofan engine 10 depicted in FIG. 1 may be configured to generate at least about 14,000 pounds of thrust at takeoff under standard day conditions (e.g., sea level and approximately 60° F.). However, in other exemplary embodiments, the turbofan engine 10 may instead be configured to generate at least about 18,000 pounds of thrust, at least about 20,000 pounds of thrust, at least about 30,000 pounds of thrust, at least about 40,000 pounds of thrust, or more. Notably, as the turbofan engine 10 depicted is configured as a commercial aircraft engine, the turbofan engine 10 may be required to generate such thrust more reliably than, e.g., a similarly-sized military aircraft engine.

It should be appreciated, however, that the exemplary turbofan engine 10 depicted in FIG. 1 is by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine.

Figure 2:
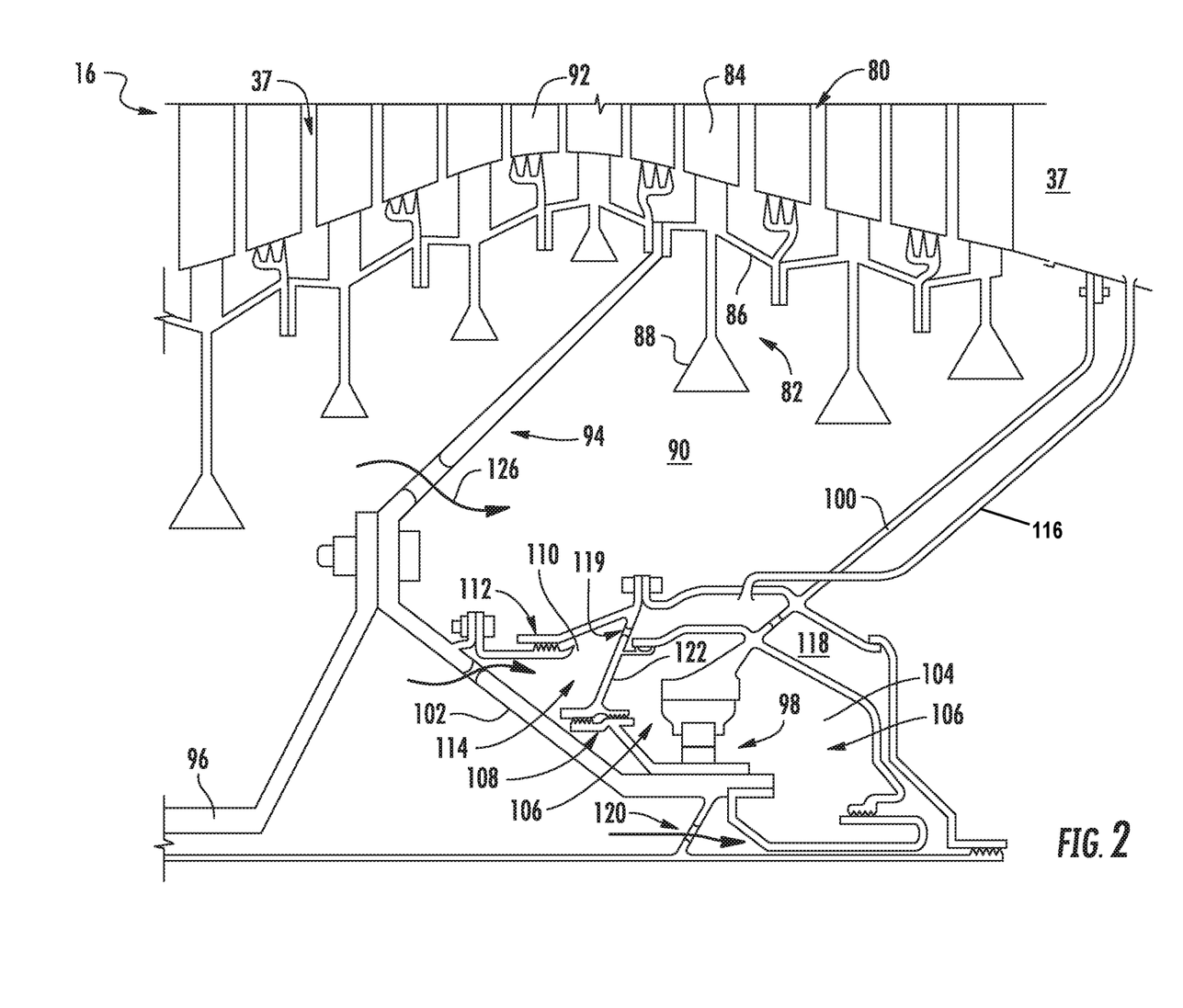
FIG. 2 is a cross-sectional view of an aft end of a gas turbine engine in accordance with another exemplary embodiment of the present disclosure.

Referring now to FIG. 2, a schematic, cross-sectional view of an aft end of a turbofan engine 10 in accordance with an exemplary embodiment of the present disclosure is provided. Specifically, FIG. 2 depicts an aft end of a core engine 16 of the exemplary turbofan engine 10 in accordance with an exemplary embodiment of the present disclosure. In certain exemplary embodiments, the exemplary turbofan engine 10 of FIG. 2 may be configured in substantially the same manner as exemplary turbofan engine 10 of FIG. 1. Accordingly, the same or similar numbering may refer to the same or similar part.

As is depicted, the core engine 16 of the turbofan engine 10 depicted includes a turbine section having a turbine 80. The turbine 80, in turn, includes a plurality of stages of rotatable rotors 82 attached to a corresponding plurality of stages of rotor blades 84 with each stage of rotors 82 including structural arms 86 attaching each respective stage of rotors 82 to the adjacent stages of rotors 82. Moreover, as depicted, each of the rotors 82 includes a base 88 positioned radially inward in a rotor bore cavity 90 defined by the turbofan engine 10. Further, between each stage of rotor blades 84, the turbine 80 includes a plurality of stator vanes 92. A structural frame member 94 is attached to the plurality of stages rotors 82 and connects such rotors 82 to a shaft 96, such that the shaft 96 is drivingly connected to the turbine 80. In at least certain exemplary embodiments, the turbine 80 of the turbine section may be configured as a low pressure turbine (see LP turbine 30 in FIG. 1) and the shaft 96 may be configured as a low pressure shaft (see LP shaft 36 in FIG. 1). Accordingly, with such an exemplary embodiment, the shaft 96 may extend forward to a low pressure compressor (see LP compressor 22 in FIG. 1), such that rotation of the shaft 96 by the turbine 80 in turn rotates the low pressure compressor.

Furthermore, the core engine 16 includes a bearing 98 for supporting rotation of the shaft 96, the structural frame member 94, and the turbine 80. Specifically, the core engine 16 includes a static frame member 100 fixed to a non-rotating component of the core engine 16. Additionally, the structural frame member 94 includes an extension 102. The bearing 98 is positioned between the static frame member 100 and the extension 102 of the structural frame member 94, such that the static frame member 100 supports the structural member and shaft 96, e.g., axially and radially, through the bearing 98. The bearing 98 depicted is configured as a single roller bearing. However, in other exemplary embodiments, the bearing may instead include a plurality of bearings, such as a pair of roller bearings, a ball bearing and roller bearing, a pair of tapered roller bearings, etc. Additionally, in certain exemplary embodiments, the bearing 98 may be formed of a metal material, such as a stainless steel, or alternatively may be formed of a nonferrous material, such as a ceramic material.

As is also depicted, the turbofan engine 10 includes a bearing sump 104 arranged in the core engine 16 for containing a lubrication provided to the bearing 98. The bearing sump 104 encloses the bearing 98, defines a bearing sump cavity 106, and includes a bearing seal 108 for preventing lubrication from escaping the bearing sump cavity 106.

Additionally, for the embodiment depicted, the bearing sump 104 is configured as a "hot" bearing sump 104 and the lubrication utilized by the turbofan engine 10 and provided to the bearing 98 is configured as "high-temperature" lubrication. For example, for the embodiment depicted, the bearing sump 104 and lubrication have an operational range between at least about zero degrees Fahrenheit (° F.) and about 550° F. Specifically, for the embodiment depicted, the bearing sump 104 and lubrication have an operational range between at least about −30° F. and about 575° F. As used herein, the term "operational range" refers to a temperature range within which the component/substance may reliably operate and to which the component/substance may continuously be exposed without experiencing any substantial deterioration. For example, the operational range of the lubrication may be a temperature range at which the lubrication may be exposed without, e.g., freezing, vaporizing, coking, or otherwise deteriorating. Notably, in certain exemplary embodiments, the lubrication may be an ionic fluid lubrication, an oil lubrication, or an ionic fluid/oil blend lubrication.

Ionic fluids may consist of large, asymmetric organic cations and usually an inorganic anion. Ionic fluids may possess virtually no vapor pressure, and due to a difficulty for these compounds to form a regular crystalline structure, they can define a relatively low pour point (i.e., temperature at which the component remains liquid). Therefore, in use, they generally present a low risk of atmospheric contamination and are liquid over a wide range of temperatures. Further, ionic liquids are generally non-flammable and thermally stable. Accordingly, in certain exemplary embodiments, the lubrication may be a non-flammable lubrication, which may allow for certain of the structural configurations discussed below.

Referring still to the exemplary embodiment of FIG. 2, the turbofan engine 10 additionally includes at most one drain compartment positioned between the sump cavity of the bearing sump 104 and the rotor bore cavity 90 of the core engine 16. Specifically, for the embodiment depicted, the at most one drain compartment is configured as a primary drain compartment 110 including a drain seal 112 and defining a primary drain cavity 114. As depicted, the bearing sump seal 108 separates the bearing sump cavity 106 of the bearing sump 104 from the primary drain cavity 114 of the primary drain compartment 110. Additionally, the drain seal 112 separates the primary drain cavity 114 of the primary drain compartment 110 from the rotor bore cavity 90. The primary drain cavity 114 is configured to capture any lubrication that leaks past the sump cavity seal 108 during operation of the turbofan engine 10.

As is also depicted in FIG. 2, the exemplary embodiment depicted further includes a single cooling channel 118, also referred to as a pressurization air cavity. Specifically, the cooling channel 118 is configured to receive a flow of cooling air at an inlet 120 from, e.g., the compressor section, and is also fluidly connected to the cavity 114 of the primary drain compartment 110 via an opening 119. Accordingly, for the embodiment depicted, the primary drain compartment 110 and cooling channel 118 are combined. The cooling channel 118 may act as a heat barrier between the bearing sump cavity 106 and the rotor bore cavity 90. Notably, however, as the bearing sump 104 and lubrication are capable of operating at a relatively high temperature, no additional barriers or drain compartments are provided outward of the bearing sump 104, other than the cooling channel 118 and primary drain compartment 110, as depicted.

Further, the turbofan engine 10 includes a drain line 116 fluidly connecting the primary drain cavity 114 to a desired location. For the embodiment depicted, the drain line 116 fluidly connects the primary drain cavity 114 to a core air flowpath 37 of the core engine 16 through the opening 119 and cooling channel 118. As discussed above, the lubrication may be configured as a nonflammable lubrication, and thus there may be less concern that the lubrication will combust if provided to the core air flowpath 37 within the turbine section of the core engine 16. With such a configuration, the core engine 16 may not require a dedicated strut extending through the core air flowpath 37 through which the drain line 116 would otherwise need to extend.

It should be appreciated, however, that in other embodiments, the drain line 116 may instead fluidly connected the drain cavity 114 to a location radially outward of the core air flowpath 37 of the core engine 16, such as to a bypass passage 56 of the turbofan engine 10, or to an ambient location or any other suitable location. With such a configuration, the core engine 16 may include a strut extending through the core air flowpath 37 through which the drain line 116 extends to such location. Additionally, although the drain line 116 is depicted fluidly connected to the primary drain compartment 114 via the opening 119 and cooling channel 118, in other exemplary embodiments, the drain line 116 may instead be directly fluidly connected to the primary drain compartment 114.

Accordingly, a gas turbine engine in accordance with one or more embodiments of the present disclosure may not require/include a supplemental drain cavity separating a bearing sump and primary drain compartment from a rotor bore cavity. Additionally, by utilizing a lubrication having a relatively high upper temperature operating range, less lubrication oil may be required to flow through the bearing sump (as the lubrication oil may accept more heat), and thus less supporting infrastructure may be required throughout the engine. For example, the engine may include smaller struts extending through the core air flowpath to accommodate lubrication supply and/or scavenge lines (not shown).

Figure 3:
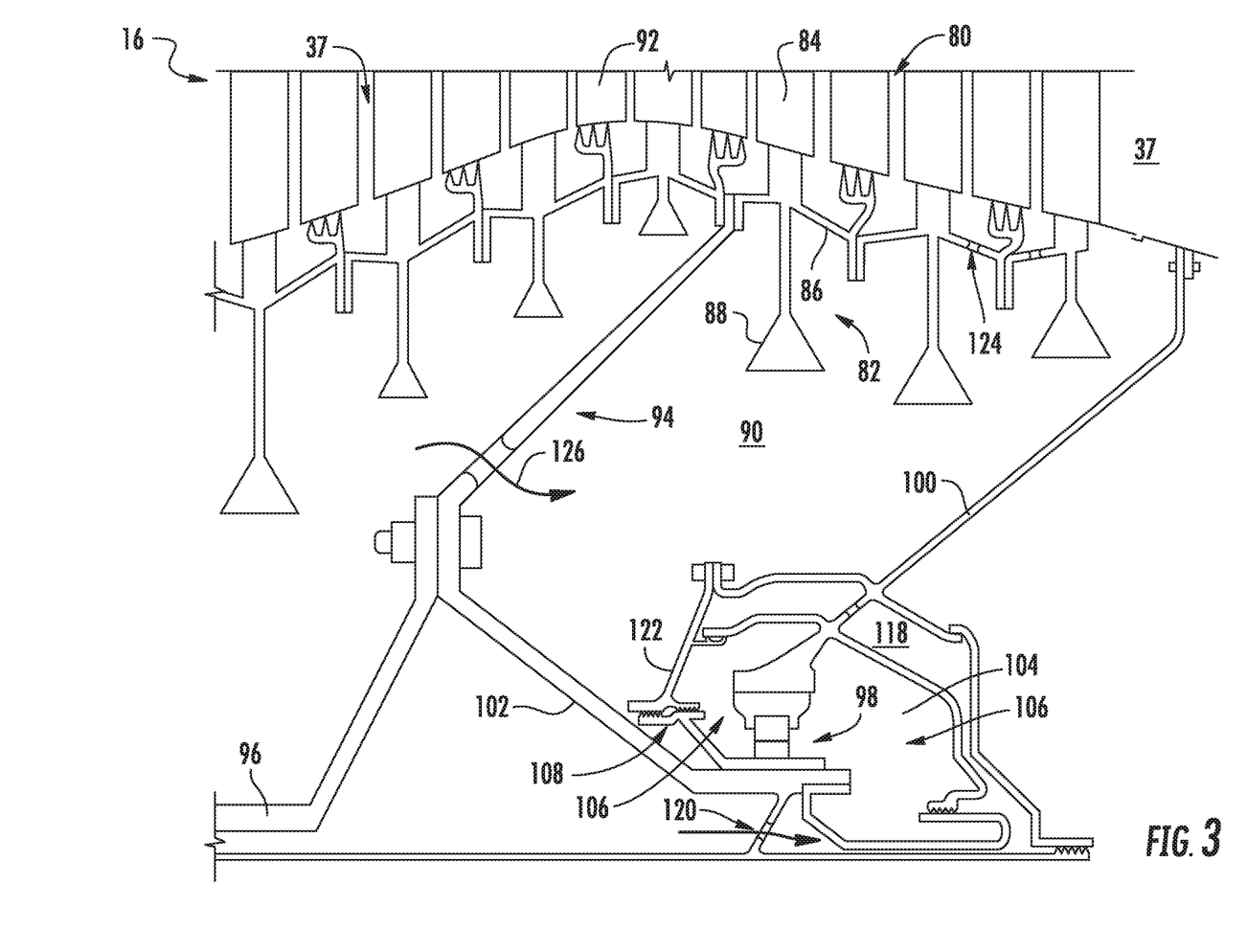
FIG. 3 is a cross-sectional view of an aft end of a gas turbine engine in accordance with yet another exemplary embodiment of the present disclosure.

Referring now to FIG. 3, an aft end of a turbofan engine 10 in accordance with another exemplary embodiment of the present disclosure is provided. The aft end of the turbofan engine 10 depicted may be configured in substantially the same manner as the exemplary turbofan engine 10 depicted in FIG. 2, discussed above. Accordingly, the same or similar numbering may refer to the same or similar part.

As depicted, the exemplary turbofan engine 10 of FIG. 3 generally includes a turbine section having a turbine 80 drivingly connected to a shaft 96 through a structural frame member 94. More specifically, the structural frame member 94 is attached to one or more of a plurality of stages of rotors 82, each rotor 82 having a base 88 positioned in a rotor bore cavity 90 defined by the turbofan engine 10. Additionally, a bearing 98 is provided for supporting rotation of the shaft 96, the bearing 98 enclosed within a bearing sump 104, or more specifically positioned within a bearing sump cavity 106 defined by the bearing sump 104.

Notably, however, for the embodiment of FIG. 3, the at most one drain compartment positioned between the sump cavity of the bearing sump 104 and the rotor bore cavity 90 is configured as no drain compartments. More specifically, the turbofan engine 10 depicted in FIG. 3 does not include a drain compartment positioned between the sump cavity of the bearing sump 104 and the rotor bore cavity 90 of the core engine 16. Accordingly, for the embodiment depicted, a bearing sump seal 108 of the bearing sump 104 separates the bearing sump cavity 106 from the rotor bore cavity 90—i.e., the rotor bore cavity 90 is positioned directly opposite the bearing sump cavity 106 from the sump seal 108. Additionally, as is depicted, with such a configuration an outer wall 122 of the bearing sump 104 is exposed directly to the rotor bore cavity 90 as well as to a bearing sump cavity 106 defined by the bearing sump 104.

With the exemplary embodiment of FIG. 3, an amount of lubrication from a bearing sump cavity 106 may still flow through the bearing sump seal 108 during operation of the turbofan engine 10. However, instead of such lubrication flowing into and collecting in a drain compartment (see FIG. 2), such lubrication flows directly to the rotor bore cavity 90. In order to prevent an amount of such lubrication from pooling up in the rotor bore cavity 90, one or more of the plurality of rotors 82 include one or more passages 124 to allow a flow of such lubrication in the rotor bore cavity 90 into a core air flowpath 37 defined by the core engine 16. Specifically, for the embodiment depicted, a plurality of passages 124 are defined in the structural arms 86 of the rotors 82.

Furthermore, as is also depicted in FIG. 3, the core engine 16 is configured to provide air 126 to the rotor bore cavity 90 during operation of the turbofan engine 10. The air 126 provided to the rotor bore cavity 90 may be a relatively hot, high pressure air. For example, the air 126 provided to the rotor bore cavity 90 may be provided from e.g., a high pressure compressor, at a temperature between about 400° F. and about 600° F. Notably, such air 126 provided to the rotor bore cavity 90 may be considered a relatively cool air as compared to the plurality of rotors 82 of the turbine 80. Accordingly, such air 126 provided to the rotor bore cavity 90 may cool the plurality of rotors 82. Additionally, such air 126 provided to the rotor bore cavity 90 may at least partially pressurize the sump cavity 106 of the bearing sump 104. More specifically, such air 126 provided to the rotor bore cavity 90 is located on an opposite side of the seal 108 from the bearing sump cavity 106 of the bearing sump 104. Accordingly, as such air 126 may be a relatively high pressure air, such a configuration may create a relatively high pressure differential across the seal 108 of the bearing sump cavity 106, such that a reduced amount of lubrication may leak through the seal 108.

Figure 4:
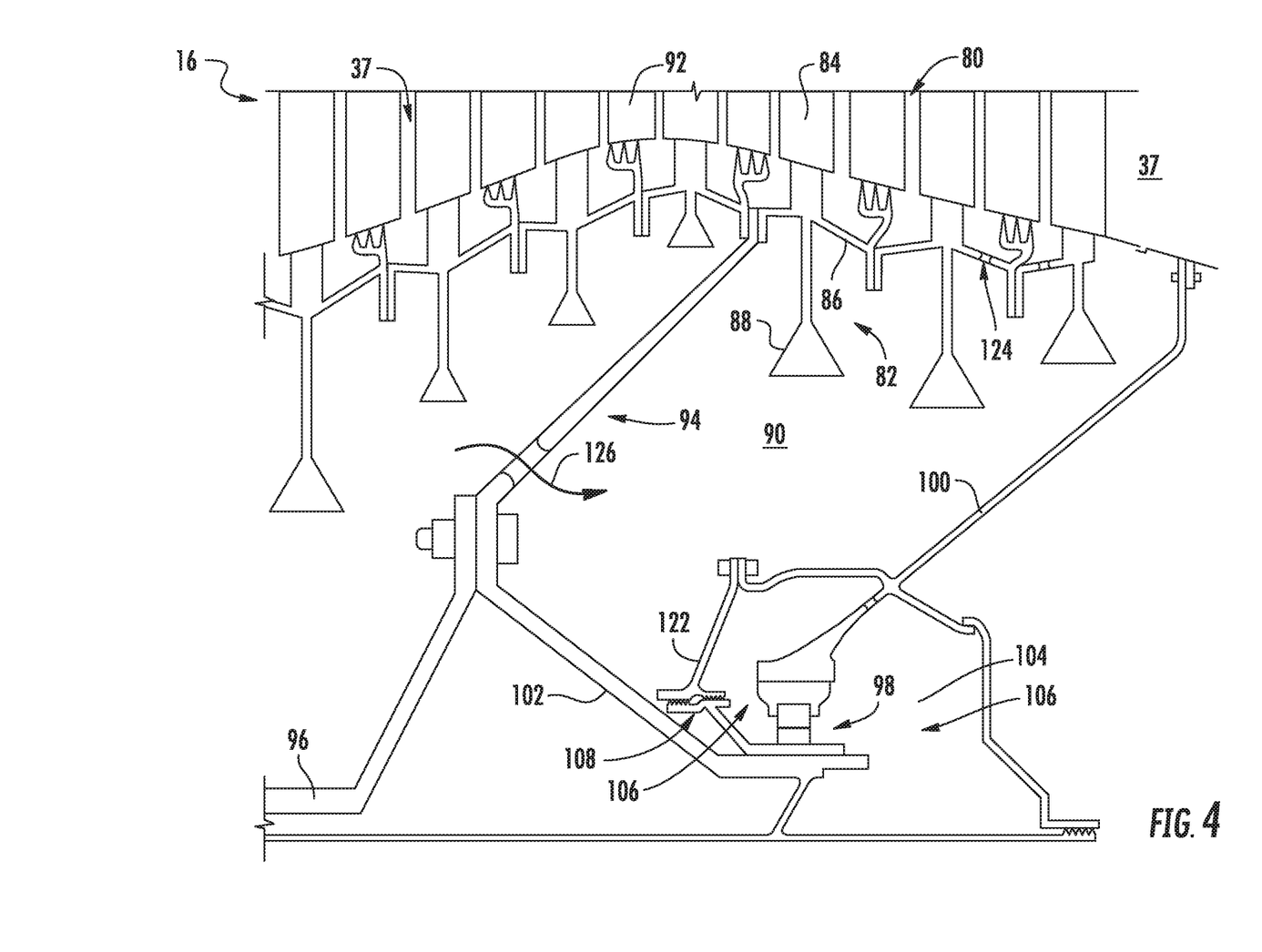
FIG. 4 is a cross-sectional view of an aft end of a gas turbine engine in accordance with still another exemplary embodiment of the present disclosure.

Referring now to FIG. 4, an aft end of a turbofan engine 10 in accordance with yet another exemplary embodiment of the present disclosure is provided. The aft end of the turbofan engine 10 depicted may be configured in substantially the same manner as the exemplary turbofan engine 10 depicted in FIGS. 2 and 3, discussed above. Accordingly, the same or similar numbering may refer to the same or similar part.

As depicted, the exemplary turbofan engine 10 of FIG. 4 generally includes a turbine 80 section having a turbine 80 drivingly connected to a shaft 96 through a structural frame member 94. More specifically, the structural frame member 94 is attached to one or more of a plurality of stages of rotors 82, each rotor 82 having a base 88 positioned in a rotor bore cavity 90 defined by the core engine 16. Additionally, a bearing 98 is provided for supporting rotation of the shaft 96, the bearing 98 enclosed within a bearing sump 104, or more specifically positioned within a bearing sump cavity 106 defined by the bearing sump 104.

Notably, however, for the embodiment of FIG. 4, the turbofan engine 10 does not include a drain compartment (such as drain compartment 110, FIG. 2) positioned between the sump cavity of the bearing sump 104 and the rotor bore cavity 90 of the turbofan engine 10. Further, for the embodiment of FIG. 4, the turbofan engine 10 does not include a cooling channel (such as cooling channel 118, FIGS. 2 and 3) at a radially outer location of the bearing sump 104. Accordingly, the exemplary bearing sump 104 depicted may not be shielded from the temperatures of the rotor bore cavity 90. Regardless, however, the operational range of the lubrication and bearing sump 104 may have a relatively high temperature limit, and thus the turbofan engine 10 may be capable of operating within the operational range of such components without a cooling channel 118 or drain cavity 114 separating the bearing sump 104 from the rotor bore cavity 90.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a core engine including an inlet, a compressor section, a combustion section, a turbine section, and an exhaust, the turbine section comprising a turbine and the core engine defining a rotor bore cavity inward of the turbine;
a bearing sump arranged in the core engine and defining a sump cavity;
a single drain compartment positioned between the sump cavity of the bearing sump and the rotor bore cavity of the core engine and comprising a drain seal and defining a primary drain cavity, wherein the bearing sump comprises a sump seal, wherein the sump seal separates the sump cavity of the bearing sump from the primary drain cavity of the single drain compartment, and wherein the drain seal separates the primary drain cavity of the single drain compartment from the rotor bore cavity;
a drain line fluidly connecting the primary drain cavity to a core air flowpath of the core engine; and
a cooling channel combined with the drain compartment through an opening, wherein the drain line is fluidly connected to the drain cavity through the cooling channel.

2. The gas turbine engine of claim 1, wherein the gas turbine engine is a commercial gas turbine engine configured to generate at least 14,000 pounds of thrust at takeoff.

3. The gas turbine engine of claim 1, wherein the bearing sump is configured to contain a lubrication, and wherein the bearing sump and the lubrication have an operational range between at least 0 degrees Fahrenheit and 550 degrees Fahrenheit.

4. The gas turbine engine of claim 3, wherein the lubricant is an ionic fluid lubrication or an ionic fluid blend lubrication.

5. The gas turbine engine of claim 1, wherein the core engine comprises a low pressure shaft, wherein the turbine section comprises a low pressure turbine for driving the low pressure shaft, and wherein the bearing sump encloses a bearing for supporting rotation of the low pressure shaft.

6. The gas turbine engine of claim 1, further comprising a cooling channel wall defining at least in part the cooling channel, and wherein the drain line is coupled to the cooling channel wall.

7. The gas turbine engine of claim 6, wherein the core engine comprises a wall defining at least in part the core air flowpath, and wherein the drain line is coupled to the wall of the core engine and extends between the cooling channel wall and the wall of the core engine.

8. The gas turbine engine of claim 7, wherein the bearing sump encloses a bearing, wherein the gas turbine engine further comprises a static frame member supporting the bearing, wherein the static frame member is coupled to the wall of the core engine, and wherein the drain line is coupled to the wall of the core engine downstream of where the static frame member is coupled to the wall of the core engine relative to the core air flowpath.

9. A gas turbine engine comprising:
a core engine including an inlet, a compressor section, a combustion section, a turbine section, and an exhaust, the core engine defining a rotor bore cavity inward of the turbine;
a bearing sump arranged in the core engine for containing a lubrication and defining a sump cavity, the bearing sump and lubrication having an operational range between at least 0 degrees Fahrenheit and 550 degrees Fahrenheit;
a single drain compartment positioned between the sump cavity of the bearing sump and the rotor bore cavity of the core engine comprising a drain seal and defining a primary drain cavity, wherein the bearing sump comprises a sump seal, wherein the sump seal separates the sump cavity of the bearing sump from the primary drain cavity of the single drain compartment, and wherein the drain seal separates the primary drain cavity of the single drain compartment from the rotor bore cavity;
a drain line fluidly connecting the drain cavity to a core air flowpath of the core engine; and
a cooling channel combined with the drain compartment through an opening, wherein the drain line is fluidly connected to the drain cavity through the cooling channel.

10. The gas turbine engine of claim 9, wherein operational range of the bearing sump and lubrication is between at least −30 degrees Fahrenheit and 575 degrees Fahrenheit.

11. The gas turbine engine of claim 9, wherein the lubrication is a non-flammable lubrication.

12. The gas turbine engine of claim 9, wherein the lubricant is an ionic fluid lubrication or an ionic fluid blend lubrication.

13. The gas turbine engine of claim 9, wherein the core engine comprises a low pressure shaft, wherein the turbine section comprises a low pressure turbine for driving the low pressure shaft, and wherein the bearing sump encloses a bearing for supporting rotation of the low pressure shaft.

14. The gas turbine engine of claim 9, wherein an amount of lubrication from the sump cavity flows through the seal of the bearing sump to the rotor bore cavity during operation of the gas turbine engine.

15. The gas turbine engine of claim 14, wherein the turbine comprises a plurality of rotors separating the rotor bore cavity from the core air flowpath of the core engine, and wherein one or more of the plurality of rotors includes one or more passages to allow lubrication in the rotor bore cavity to flow into the core air flowpath.

16. The gas turbine engine of claim 9, further comprising a cooling channel wall defining at least in part the cooling channel, and wherein the drain line is coupled to the cooling channel wall, wherein the core engine comprises a wall defining at least in part the core air flowpath, and wherein the drain line is coupled to the wall of the core engine and extends between the cooling channel wall and the wall of the core engine.

* * * * *